Feb. 20, 1934.  E. M. SHINKLE  1,947,502
STOP FOR ROTATING PARTS
Filed Jan. 23, 1933

Inventor
Edward M. Shinkle
W. N. Roach
Attorney

Patented Feb. 20, 1934

1,947,502

UNITED STATES PATENT OFFICE 1,947,502

STOP FOR ROTATING PARTS

Edward M. Shinkle, United State Army, Higginsport, Ohio

Application January 23, 1933. Serial No. 653,076

5 Claims. (Cl. 192—4)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a stop for rotating parts.

This invention relates generally to mechanism for preventing rotation of a driven member in one direction and, more especially to means mounted adjacent to a shaft, pinion, or the like for preventing its rotation, save in a given direction, that is, clockwise or counter-clockwise as the case may be.

Specifically, when applied to transmissions for automobiles, it is to provide that when an automobile is moving rearward under the action of its transmission gearing and the transmission is shifted to neutral or to any forward gearing, the stop mechanism cannot operate to prevent backward movement until after the rearward motion of the vehicle has stopped, and the vehicle has moved forward.

This invention constitutes an improvement in and further development of the inventions disclosed in Patents Nos. 1,625,571; 1,830,135; 1,849,727 and 1,859,408.

The main object of this invention is to reduce to a minimum the effort necessary in operating a mechanism of this character.

Accomplishment of the object above set forth has been attained by the provision of a pawl lock which is assisted in its unlocking movement by the action of the pawl in moving to disengaged position.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein.

Figure 1:
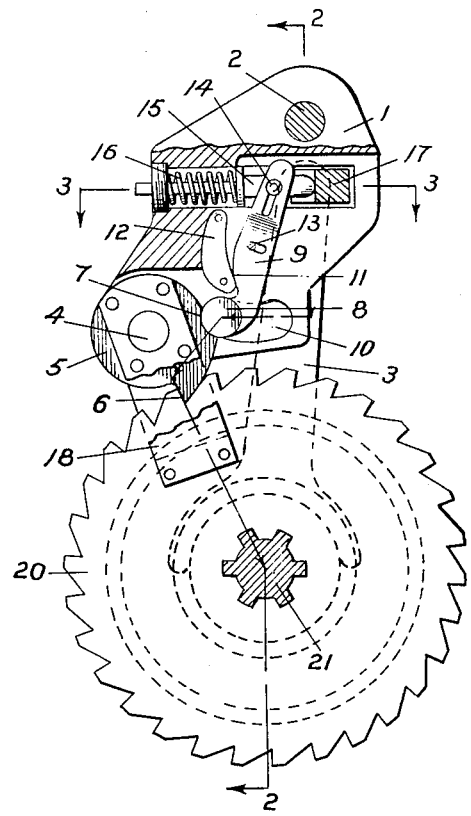
Fig. 1 is a sectional view on the line 1—1 of Fig. 2 showing the arrangement of a single acting pawl, or a portion of a double acting pawl constructed in accordance with the invention.
Figure 2:
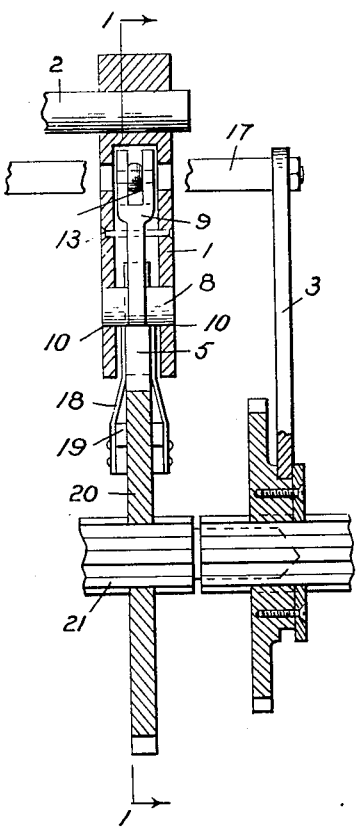
Fig. 2 is a sectional view on the line 2—2 of Fig. 1.

Referring to the drawing by numerals of reference:

A pawl body 1 is mounted for slight rocking movement on a shaft 2 and is in position to be controlled through shifting of the shifting fork 3, as will hereinafter more fully appear. Mounted for rocking movement on a shaft 4 carried by the pawl body 1 is a pawl 5, formed with a tooth 6 and a curved or concave depression 7 adapted to receive the cylindrical end 8 of a lever 9, the cylindrical end extending laterally beyond the lever and engaging in arcuate slots 10—10 formed in the sidewalls of the body 1.

The lever 9 is mounted between the side walls of the body 1 and one edge thereof is curved or bellied as at 11, and rests against a curved plate 12 either secured in the body 1 as shown or formed integral therewith. At a median position on the lever 9 a short transverse slot is formed to receive a pin 13 fast in the body, while at the upper end of the lever a longitudinal slot is formed to receive the pivot pin 14 secured in a spring pressed plunger 15 housed in a recess in the body 1 and urged in one direction by a coil spring 16. A control rod 17, similar to the rods described in the before mentioned patents is shiftable through an aperture in the body 1, being shifted with the shifting gear, to cam the plunger 15 against the tension of the spring 16 and thereby rock the lever 9 to withdraw the cylindrical end 8 thereof from the depression 7, when the gear is shifted to reverse, thus freeing the pawl 5. As will be apparent from a consideration of Fig. 1, the aperture in the body 1 is only of sufficient extent to permit slight or restricted rocking movement of the body to allow the pawl to clear the teeth of the ratchet when the ratchet is rotating counter-clockwise as viewed in said figure.

The pawl 5 has mounted thereon plates 18—18, carrying friction members 19—19 which are adapted to engage a ratchet or gear wheel 20, fast on the drive shaft 21.

Figure 3:
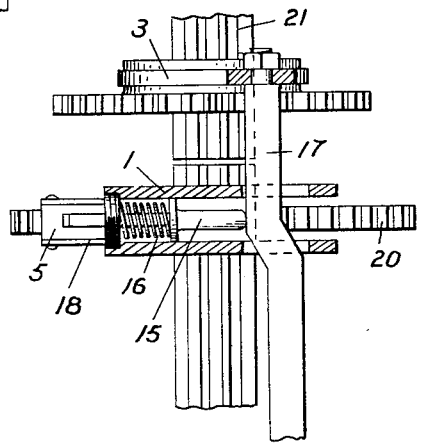
Fig. 3 is a sectional view on the line 3—3 of Fig. 1, the parts shown in reverse position.

The operation of the pawl is as follows:

When the gears are shifted to neutral or first speed forward and the vehicle drifts backward under the action of gravity, the body 1 will be rocked, by reason of the frictional engagement of the members 19—19 with the ratchet wheel 20, causing the parts to assume the positions shown in Fig. 1, thereby locking the parts against movement. When the gears are shifted to reverse, as seen in Fig. 3, the control rod 17 cams the plunger 15 to one side against the tension of the spring 16 thereby rocking lever 9 and withdrawing the cylindrical end 8 from the depression 7, which movement will be assisted by the camming action of the pawl, thereby freeing the pawl 5. As long as the ratchet wheel 20 rotates in a clockwise direction (as viewed in Fig. 1) the pawl will be held disengaged by reason of the contact therewith of the friction members 19—19 carried by the plates 18—18 and will not reengage the ratchet teeth until the direction of rotation has been reversed. By this means it is assured that there will be no sudden locking of the parts while they are still moving rapidly in one direction.

When the direction of rotation of the ratchet wheel 20 is reversed the plates 18 and pawl 5 will be rocked in a direction to cause the pawl 5 to engage through its tooth 6, with the ratchet 20, in which position the cylindrical end 8 of the lever 9 will again enter the depression 7 under the action of the spring 16.

It will be apparent that small effort is required to swing the lever 9 as it moves by rocking action of the curved edge of the lever on the plate thereby reducing friction and also is assisted in its movement toward disengaged position after initial movement by the camming action of the pawl.

I claim:

1. The combination with a rotatable member provided with pawl engageable elements, of a pawl body mounted for rocking movement adjacent to said member, a pawl carried by the body and arranged for rocking movement independent of the body, said pawl provided with a curved depression, a lever mounted in the body, a cylindrical end on the lever adapted to engage in the depression to lock the pawl against independent movement, means for rocking the lever upon shifting of a gear to release the pawl, and means for disengaging the pawl and holding it in disengaged position until reversal of the movement of the rotatable member.

2. The combination with a rotatable member provided with pawl engageable elements, of a pawl body mounted for rocking movement adjacent to said member, a pawl carried by the body and arranged for rocking movement independent of the body, said pawl provided with a curved depression, a lever mounted in the body, a cylindrical end on the lever adapted to engage in the depression to lock the pawl against independent movement, said curved depression and cylindrical end cooperating to cam the lever upon initial movement toward pawl releasing position, means for rocking the lever upon shifting of a gear, and means for holding the pawl in disengaged position until reversal of the movement of the rotatable member.

3. The combination with a rotatable member provided with pawl engageable elements, of a pawl body mounted for rocking movement adjacent to said member, a pawl carried by the body and arranged for rocking movement independent of the body, said pawl provided with a curved depression, a lever mounted in the body, a curved edge on the lever, a plate carried by the body and contacting the curved edge of the lever, means for positioning the levers whereby it may rock through its curved edge upon said plate, a cylindrical end on the lever adapted to engage in the depression to lock the pawl against independent movement, means for rocking the lever upon shifting of a gear to release the pawl, and means for holding the pawl in disengaged position until reversal of the movement of the rotatable member.

4. The combination with a rotatable member provided with pawl engageable elements, of a pawl body mounted for rocking movement adjacent to said member, said body provided with arcuate slots, a pawl carried by the body and arranged for rocking movement independent of the body, said pawl provided with a curved depression, a lever mounted in the body, a cylindrical end on the lever slidable in the slots and adapted to engage the depression to lock the pawl against independent movement, and means for rocking the lever to release the pawl.

5. A pawl mounted for rocking movement, said pawl provided with a curved depression, a lever mounted adjacent the pawl, a curved end on the lever adapted to enter the depression to lock the pawl against movement, a curved edge on the lever, and a plate contacted by the curved edge whereby throw of the lever is had through rocking of the curved edge upon the plate.

EDWARD M. SHINKLE.